United States Patent [19]

Guidos

[11] Patent Number: 4,725,836
[45] Date of Patent: Feb. 16, 1988

[54] SERIES PORT CONNECTION OF A PLURALITY OF TERMINALS TO A MASTER PROCESSOR

[75] Inventor: David T. Guidos, Big Bear City, Calif.

[73] Assignee: Snap Systems, Inc., Santa Monica, Calif.

[21] Appl. No.: 823,036

[22] Filed: Jan. 27, 1986

[51] Int. Cl.⁴ ............................ H04Q 9/00; H04J 3/00
[52] U.S. Cl. ..................... 340/825.590; 340/825.520; 370/85; 375/36
[58] Field of Search ...................... 340/825.59, 825.05, 340/825.08, 825.52; 370/85; 375/36, 7, 121; 179/2 C, 2 DP; 178/63 R, 69 R

[56] References Cited

U.S. PATENT DOCUMENTS

| | | | |
|---|---|---|---|
| 4,086,534 | 4/1978 | Olson | 375/7 |
| 4,403,111 | 9/1983 | Kelly . | |
| 4,534,038 | 8/1985 | Dodds | 375/121 |
| 4,547,879 | 10/1985 | Hamelin et al. | 370/85 |
| 4,597,076 | 6/1986 | Bingham et al. | 370/85 |
| 4,601,030 | 7/1986 | Croiser | 340/825.5 |
| 4,607,379 | 8/1986 | Marshall, Jr. et al. | 375/36 |
| 4,621,367 | 11/1986 | Horiguchi et al. | 375/36 |
| 4,628,308 | 12/1986 | Robert | 340/825.08 |
| 4,636,790 | 1/1987 | Diamond | 340/825.52 |
| 4,654,655 | 3/1987 | Kowalski | 340/825.5 |

Primary Examiner—Donald J. Yusko
Attorney, Agent, or Firm—Robert Schaap

[57] ABSTRACT

A circuit arrangement for connecting a plurality of digitally operated terminals to a single communications circuit of a master digital processing unit, such as a central computer, for transmission of information therebetween. The circuit comprises a first data bus for delivery of information from the processing unit to the terminals and a second data bus for delivery of information from each of the individual terminals to the central processing unit. A connecting circuit connects each of the individual terminals to the buses in a series arrangement such that each of the terminals are serially connected to the central computer through the single central port thereof. A line isolation circuit is associated with each of the terminals and comprises a diode in the output line of that terminal to enable data on the second of the buses to maintain a certain signal level and to prevent any other terminal, serially connected to the buses, from simultaneously drawing down the voltage level of the signal being transmitted to the central terminal. A pull-down resistor is also connected to one or more of the terminals to reduce the voltage level on that bus when data delivery has been completed. This circuit arrangement is especially useful for the RS-232 communication circuit format.

16 Claims, 5 Drawing Figures

SERIES PORT CONNECTION OF A PLURALITY OF TERMINALS TO A MASTER PROCESSOR

BACKGROUND OF THE INVENTION

1. Field of the Invention

This invention relates in general to certain new and useful improvements in a device and method for a series port connection of a plurality of terminals to a master processor, and more particularly, to a device and method which enable a plurality of terminals to be connected in parallel across a data input bus and a data return bus from a central processor and where each of the terminals are connected in series with respect to the master central processor.

2. Brief Description of the Prior Art

Various circuit arrangements for transferring analog information between a central console and a plurality of terminals addressing that central console or central station are well known and, in general, utilize a conventional time sharing arrangement. These systems require multiple bus lines for transmitting the terminal address. Exemplary of such prior art analog time sharing systems for analog data transmission is that system described in U.S. Pat. No. 3,633,165 to Gilbert.

In the case of digital data transmission as for example, between a central computer or central microprocessor and a plurality of terminals, the connection of the terminals to the central computer may become a more complex arrangement. With the advent of small portable and so-called "desk top computers" with large memory capabilities, there has been a recent interest in utilizing the small desk top computer as a central processor or main computer station with a plurality of terminals accessing the central station desk top computer. However, most of the conventionally available desk-top or small portable computers only have a very limited number of serial ports and thus, the number of computer terminals which may be connected to and access that central computer station are limited by the number of serial ports on the computer at that central station.

In recent years, there have been several available rather sophisticated solid state switching devices to enable the use of time division for information transmission. In this way, sampling techniques are used to enable a large number of users to communicate over a single line or a single bus while only selected interconnections between a central station and individual terminals are established.

These time division communication systems are relatively complex and expensive and are not adaptable for many uses. Moreover, they are not commonly used on smaller computers. In addition, they require specialized hardware in both the computer and the terminal. Exemplary of such prior art systems is U.S. Pat. No. 3,916,108 to Schwartz.

Telemetry systems which multiplex data from a plurality of sources onto a common bus are described in U.S. Pat. No. 4,386,426 to Pugh. Each of the terminals, which are considered to be remote stations, are connected to the data buses individually and are series connected relative to one another. Here again, the system in the Pugh patent also operates on a time division arrangement.

Another arrangement for collecting information at and distributing information from a master station from a number of terminal stations is disclosed in U.S. Pat. No. 3,824,545 to Brenner et al. In the Brenner et al system, a plurality of terminals are connected to a master station over a single transmission line and a plurality of collecting lines. Each of the terminals utilizes an ordered mutually time division arrangement for transmission of the information. Each terminal station is actuated after the preceding terminal station and before the next subsequent station. For this purpose, each terminal station is provided with a delay unit actuated by the trailing edge of a pulse supplied by the preceeding terminal station.

U.S. Pat. No. 3,217,177 to Walker discloses logic circuits which use diode gates on the outputs to a single transmission line. Each diode gate drives an emitter-follower arrangement and each gate is biased to draw low current so as to preclude the loading of any other gate signal source to thereby eliminate large reflections on the transmission line.

U.S. Pat. No. 2,708,220 to Levy also discloses a multi-channel communications system in which exchanges, such as telephone exchanges, may be connected to one another by several channels. Communication again occurs on a time-division pulse arrangement. This patent also discloses signal direction controlling diodes in the output lines.

Heretofore, there has not been any available low cost system which enables a plurality of relatively inexpensive computer terminals to access a relatively inexpensive small computer through a single serial access port without the necessity of engaging in complex time-division arrangements and the attendant circuitry.

OBJECTS OF THE INVENTION

It is, therefore, one of the primary objects of the present invention to provide a circuit arrangement for connecting a plurality of digitally operated terminals to a single communications circuit of a master processing unit such that each of the terminals are serially connected to the master processing unit and in which a line isolation circuit is associated with each terminal for maintaining a data signal level on a data transfer bus without any other terminal affecting the signal level of that data signal.

It is another object of the present invention to provide a circuit arrangement of the type stated in which a line isolation circuit is associated with at least one of a plurality of terminals connected to a central processing unit and which utilizes a component to reduce the voltage level on a data bus to a non-data signal level when any data transmission has been completed.

It is still another object of the present invention to provide a circuit arrangement of the type stated having a plurality of terminals serially connected to a master computer for communications therebetween and which uses a diode on the output of each terminal to enable a data signal level to be maintained, and at least one pull-down resister to reduce signal level to a non-data signal level when communications have been completed.

It is a further object of the present invention to utilize a circuit arrangement of the type stated such that a plurality of inexpensive terminals can be serially connected to a single serial port of a relatively inexpensive central processing computer.

It is an additional object of the present invention to provide a circuit arrangement of the type stated which takes advantage of high performance relatively low cost state of the art communication circuits.

It is also an object of the present invention to provide a circuit arrangement for serially connecting a plurality of terminals to a central computer using an RS-232 circuit interface format.

It is another salient object of the present invention to provide a system for multiplexing digital information between a central master processing unit and a plurality of terminals serially connected to a communications circuit of that central master processing unit.

With the above and other objects in view my invention resides in the novel features of form, construction, arrangement and combination of parts presently described and pointed out in the claims.

BRIEF SUMMARY OF THE DISCLOSURE

A circuit arrangement for connecting a plurality of digitally operated terminals, such as computer terminals, to a single communications circuit of a master digital processing unit for transmission of information between the processing unit and the individual terminals. The master digital processing unit, may adopt the form of a central computer, such as a so-called "portable" or "desk-top" computer. Generally, the single communications circuit forms part of a serial port of that central computer. In this way, all of the terminals, or at least a plurality of the terminals, may be connected in a serial arrangement with respect to that single serial port of the central computer.

The circuit arrangement of the present invention generally comprises a first data bus or so-called "delivery" bus from the communications circuit of the central computer for delivery of digital information from the central processing unit or central computer to any one or more individual terminals. In addition, the communications circuit comprises a second data bus connected to and extending from the communications circuit of the central computer for delivery of digital information from any of the individual terminals to the central processing unit or central computer. Preferably, a third data bus may be connected to and extend from the communications circuit of the central computer for delivery of digital information from the central computer to the individual terminals. When a third data bus is employed, one of the second or third data buses carries actual data and the other carries either address information or a line accessing signal.

The term data "bus" is used in that sense to refer to a single data line as opposed to a data bus representing a plurality of lines. Thus, the first, second and third data buses are each single lines.

A connecting means connects each of the individual terminals to the first data bus and the second data bus. More particularly, the connecting means generally connects each terminal across the first data bus and the second bus in a parallel arrangement with respect to those buses. However, each of the terminals are connected in a series arrangement with respect to the communications circuit of the central computer.

The data which may be transferred between the terminals and the central computers is represented by positive voltage level data bits and negative voltage level data bits. Further, the data buses are idle and carry no data when the buses are at the negative voltage level (non-data signal level), as hereinafter described.

The present invention provides a line isolation circuit means which is operatively associated with the circuit arrangement and comprises a first component associated with each individual terminal to enable a data signal voltage level on a data line to be maintained at certain data signal levels containing positive voltage data bits and negative voltage data bits without any other terminal simultaneously drawing down the level of that data signal. In this way, any one terminal can transmit data to the central computer and the voltage level representing that data signal will always be maintained at the desired voltage level.

In addition, the line isolation circuit means comprises at least one other element which is associated with at least one or more of the terminals for drawing down the voltage level on that data bus to a non-data signal level when data delivery has been completed.

In a preferred embodiment, the first element of the line protective circuit means comprises a diode and the second element is a pull-down resistor. The data signals may contain positive voltage bits which are always at a selected positive voltage level such that any data transmission will always take place with the positive voltage bits at that selected positive voltage level. The data signals will also contain the negative voltage bits as well. The negative voltage bits are of a negative voltage level approximately equal in magnitude to that of the positive voltage bits but of opposite polarity. A non-data signal level is also a negative voltage level approximately equal in magnitude to that of the positive voltage level bits, but which is again of the opposite polarity.

The present invention can also be considered to be an improvement in a circuit arrangement for multiplexing digital data between a plurality of terminals and a master processing unit over a first data line from the master processing unit and a second data line to the master processing unit and where all of the terminals are connected serially with respect to a single series communication circuit of the master processing unit. This improvement comprises the diode on the output of each terminal connecting the terminal to the data line to the computer or master processing unit so that a data signal of a selected voltage level from a terminal can be introduced on this data line for delivery to the master processing unit. As indicated, no other terminal will reduce that selected voltage level because of the diode on the output of each other terminal. In addition, the improvement comprises a pull-down resistor on the output of at least one of the terminals to reduce the voltage level on the data line back to the processing unit to the non-data signal level when data delivery has been completed.

This invention possesses many other advantages and has other purposes which may be made more clearly apparent from a consideration of the forms in which it may be embodied. These forms are shown in the drawings forming part of and accompanying the present specification. They will now be described in detail for purposes of illustrating the general principles of the invention, but it is to be understood that such detailed descriptions are not to be taken in a limiting sense.

BRIEF DESCRIPTION OF THE DRAWINGS

Figure 1:
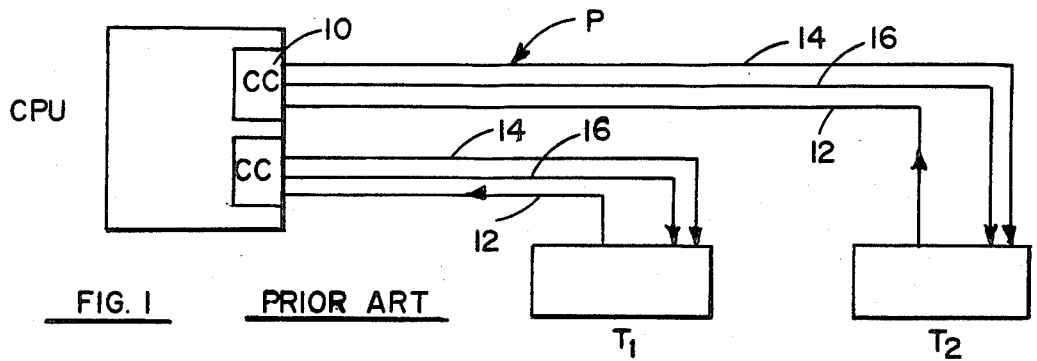
Figure 2:
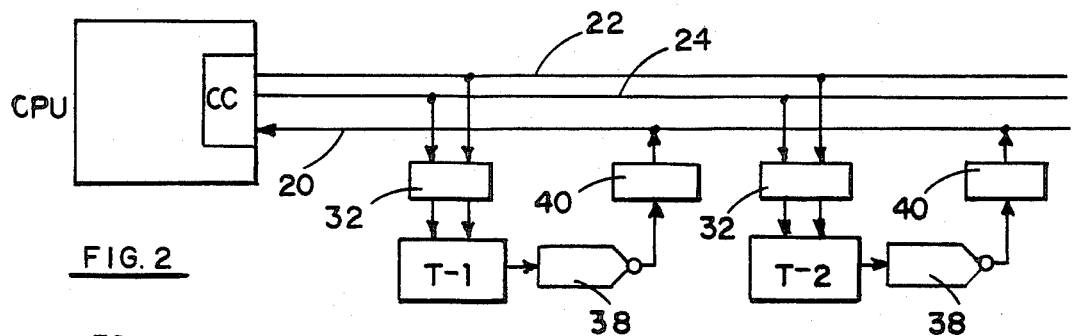
Figure 3:
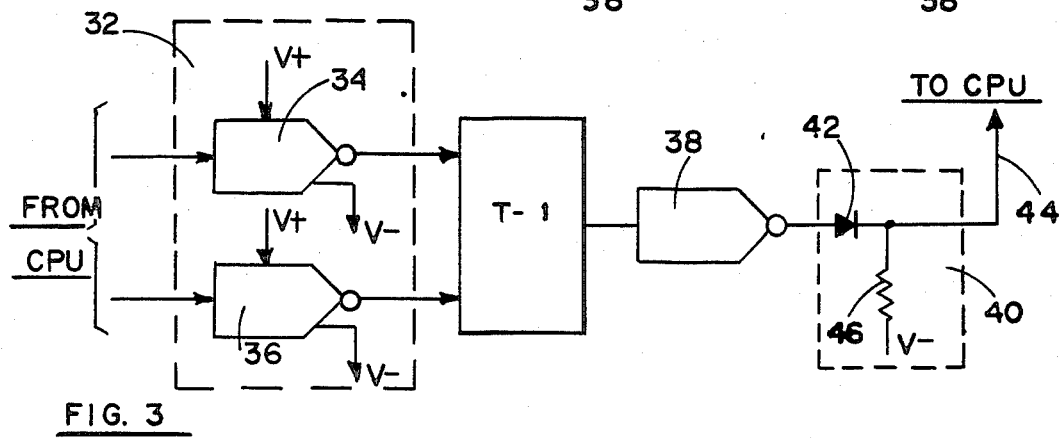
Figure 4:
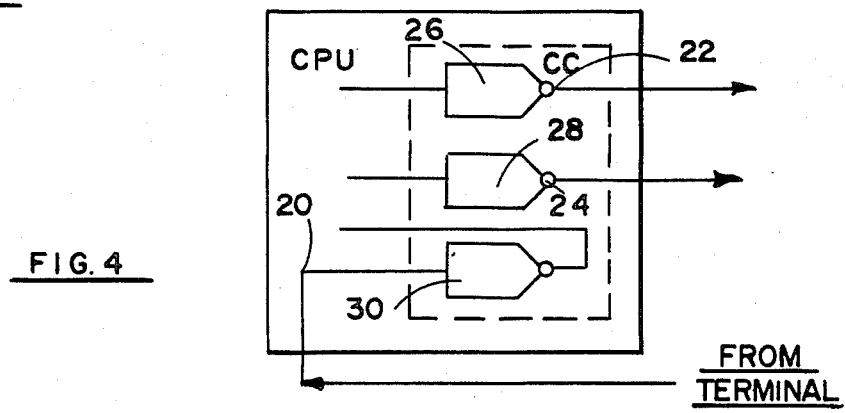
Figure 5:
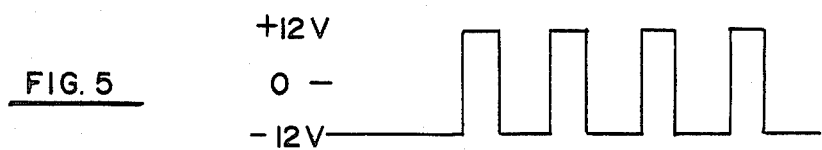

Having thus described the invention in general terms, reference will now be made to the accompanying drawings in which:

FIG. 1 is a schematic circuit view of a conventional prior art system for connecting a plurality of terminals to a central processing unit;

FIG. 2 is a schematic circuit view showing the serial connection of a plurality of terminals with respect to a central processing unit in accordance with the present invention;

FIG. 3 is a schematic circuit view showing a portion of an individual terminal and a line isolation circuit therefore;

FIG. 4 is a schematic circuit view showing a portion of the communications circuit of the central computer; and FIG. 5 is a schematic wave form showing voltage levels in a data signal and a non-data signal.

DETAILED DESCRIPTION OF A PREFERRED EMBODIMENT

Referring now in more detail and by reference characters to the drawings which illustrate a practical embodiment of the present invention P designates a prior art circuit arrangement for connecting a plurality of computer terminals T-1 and T-2 to a central processing unit CPU. In this case, the terminals T-1 and T-2 may take the form of an input terminal or any other type of terminal which accesses a central station. The central processing unit CPU may take the form of a main digital computer.

In the prior art arrangement P, as illustrated, the terminals T-1 and T-2 are each individually connected to a separate communications circuit 10 of the central processing unit such that two individual terminals T-1 and T-2 require two individual communications circuits 10. Each of these communications circuits would be located at a separate communications port of that central computer. Moreover, each terminal is connected to the central processing unit CPU by means of a single data input line 12 and a pair of data return lines 14 and 16, in the manner as illustrated.

FIGS. 2 and 3 illustrate the circuit arrangement for serially connecting a plurality of terminals T-1, T-2, . . . T-n to the communications circuit CC of a central processing unit CPU in accordance with the present invention. The central processing unit CPU, again, may adopt the form of a main central computer.

In accordance with the circuit arrangement of the present invention, a single data input bus 20 is connected to the communications circuit, Cc, of the main computer CPU and which extends outwardly to each of the individual terminals T. This data bus 20 is often referred to as a "first" data bus. Further, a pair of data buses 22 and 24 provide for data delivery to each of the individual terminals T or at least certain of those terminals T. A pair of output buses, such as the buses 22 and 24, are normally employed such that one of the buses 22 provides indication of a forthcoming data transmission and in effect, alerts each of the individual terminals to potential forthcoming information. The data bus 24 literally carries the data signals for that information or address information or both, and the data bus 22 carries a line accessing signal.

The communications circuit of the computer, which is more fully illustrated in FIG. 4, comprises a pair of transmitters or so-called "drivers" 26 and 28 and which are, respectively, connected to the output lines 22 and 24 from the communications circuit CC. These drivers are preferably the microchip known as MC 1488 produced by the Motorola Corporation. In addition, the communications circuit CC includes a single receiver 30 which receives the input from any of the terminals over the bus 20. In the embodiment as illustrated, the output of the receiver 30 is shown as being introduced into the central processing unit. This portion of the central processing unit which receives the data from the terminals and processes the same is conventional and is therefore neither illustrated nor described in any further detail herein. In like manner, it should be understood that the output of the central processor CPU is also introduced directly into the drivers 26 and 28.

Each of the terminals T is provided with its own receiver circuit 32 which is connected across the two output buses 22 and 24 from the central processing unit CPU. In addition, the receiving circuit has inputs directed into the associated terminal. Referring now to FIG. 3, it can be observed that each receiving circuit 32 comprises a pair of receivers 34 and 36 and which are connected respectively to the buses 22 and 24. The individual receivers 34 and 36, also have individual outputs directed to the associated terminals T. In the embodiment as illustrated in FIG. 3, it can be observed that the receivers 34 and 36 are each individually connected to a positive voltage source and a negative voltage source, such as a voltage ground. Thus, the receivers 34 and 36 each enable the terminals T to read a positive voltage signal representing a data bit and a negative voltage signal of approximately the same magnitude which represents a negative data bit and also a non-data signal.

The central computer and each of the terminals are capable of distinguishing between a negative data bit forming part of a data signal and a non-data signal since each sector of data starts with a data start bit and terminates with one or more data stop bits. In this way, the circuit arrangement of the present invention enables negative data bits to be of the same negative voltage level as a non-data signal level.

Each terminal is provided on its output with a driver circuit comprising an individual driver 38, also in the manner as illustrated in FIGS. 2 and 3 of the drawings. The receivers 34 and 36 may be the same type of receiver as the receiver 30 in the communication circuit CC. In like manner, the drivers 38 may be the same type of driver as those drivers 26 and 28 employed in the communication circuit CC.

The output of each terminal driver 38 is introduced into a line isolation circuit 40 associated with each terminal, in the manner as illustrated in FIGS. 2 and 3. The line isolation circuit 40 has an output connected directly to the data bus 20 for delivery of information from the terminal to the main computer CPU.

The line isolation circuit 40 associated with the terminal T-1 is more fully illustrated in FIG. 3 of the drawings. The line isolation circuit 40 generally comprises a diode 42 which is biased outwardly with respect to the driver 38 from that terminal. The receiver circuit 32 normally receives the input signal from the central processing unit CPU over the data line 24 as illustrated. The output signal from the terminal T-1, and its associated line isolation circuit 40, is carried over an output conductor 44 which is, in turn, connected directly to the return line 20, as illustrated. Interposed in the output conductor 44 is the diode 42 which, in effect, biases the signal to the return bus 20.

Referring now to FIG. 5, it can be observed that each data signal has positive voltage bits of a certain positive voltage level, which in this case, may be a positive 12 volt level as shown. Moreover, the data signal contains negative voltage data bits of a negative voltage level which is a negative 12 volt level. In addition, when there is no data communications on the line, the line is reduced to a minus voltage level which is of the same magnitude as the positive data bits, but of opposite polarity and in this case, a lack of data is referred to as the non-data voltage level. Thus, referring again to FIG. 5 it can be observed that the non-data voltage level is also a negative 12 volts.

Returning now to FIGS. 2 and 3, it can be observed that any data transmitted over the data bus 20 to the central processing unit CPU will always be biased through the diode 42 to the positive 12 volt level. Moreover, any other terminals, such as the terminal T-2, when inactive, will not reduce the positive 12 volt data bits of the data signal on that line in view of the diode 42 of such other terminal or terminals.

The line isolation circuit for the terminal T-1 also includes a pull-down resistor 46, and which is typically a 10 K-ohm resistor, on the output of the diode 42. This resistor 46 is also connected to the negative voltage level, as shown. The pull-down resistor 46 is effective to automatically reduce the voltage level on the return line 20 back to the minus 12 volt level for negative voltage level data bits and for non-data voltage levels. In this way, the signal on the return line 20 will not float at the zero voltage level after data transmission is completed, thereby preventing the central computer from receiving a "grey" signal which may be read as either a positive voltage signal or a negative voltage signal.

It can also be observed that it is possible to maintain only one pull-down resistor 46. Thus, the line isolation circuits of each of the other terminals would only include the diode 42 but not necessarily include the pull-down resistor 46. However, it should be understood that each line isolation circuit 40 could have its own individual pull-down resistor 46.

The present invention is highly effective for use with the RS-232 interface format, or so-called "standard". This standard is one which has been developed by the Electronics Industries Association as an interface format between data terminal equipment and data communication equipment which employs serial binary data interchange, as for example, as specified in the June, 1981 standard publication or RS-232-C of the Electronic Industries Association of Washington, D.C.

This format is highly effective for and used primarily with data signaling rates in the range of 0 to about 20,000 bits per second of information. Further, use of this format does not require electrical isolation between equipment on opposite sides of an interface point. Generally, the RS-232 circuit format operates with a positive voltage signal and a negative voltage level of opposite polarity and equal magnitude. Thus, the RS-232 circuit can be used to represent positive data bits and a negative voltage signal of the same magnitude, but of opposite polarity to represent negative data bits or a non-data signal, e.g. the lack of data information. More specifically, the RS-232 standard circuit format is utilized with a voltage range of about −3 volts to about −25 volts to represent negative voltage data bits, or a non-data level and about +3 volts to about +25 volts to represent positive data bits in a data signal.

The RS-232 circuit format also utilizes a standard pin arrangement in which the pin commonly designated as Pin No. 2 is connected to the terminal driver and the pin commonly designated as Pin No. 3 is connected to a receiver on a terminal. The pin commonly designated as Pin No. 7 is connected to a ground on the terminal and the pin commonly designated as Pin No. 20 is connected to one of the receivers on the terminal.

Thus, there has been illustrated and described a unique and novel circuit arrangement for connecting a plurality of digitally operated terminals to a single communications circuit of a master digital processing unit and where each of the terminals are serially connected with respect to the master processing unit and where each of the terminals are protected by a line isolation circuit. Thus, the present invention fulfills all of the advantages and all of the objects which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described my invention, what I desire to claim and secure by letters patent is:

1. A circuit arrangement for connecting a plurality of digitally operated terminals to a single communications circuit of a master digital processing unit for transmission of information between the processing unit and the individual terminals, and where positive polarity voltage levels and certain negative polarity voltage levels represent a data segment of information to be transmitted and which data segments are identified by data start bits and data stop bits, and negative polarity voltage levels represent non-data signal levels, each said positive and negative polarity levels further being defined to exist in predetermined voltage ranges and with voltages between these ranges representing floating ground voltages, said circuit arrangement comprising:

(a) a non-looped data delivery bus from said communications circuit having only one end terminating at said communications circuit for delivery of digital information from said processing unit to any of the individual terminals and not having the opposite end of said data delivery bus looped back to said communications circuit, (b) a non-looped data return bus from said communications circuit having only one end terminating at said communications circuit for delivery of digital information from any individual terminal to the processing unit and not having the opposite end of said data return bus looped back to said communications circuit, (c) connecting means connecting each of said individual terminals to said data delivery bus and data return bus so that each of said terminals are in a series arrangement with respect to said single communications circuit, and in parallel arrangement across said data delivery bus and data return bus, and (d) a line isolation circuit means operatively associated with said circuit arrangement and comprising a first component in each connecting means to permit a positive data signal voltage level on the data return bus without any other terminal simultaneously driving down the positive bit voltage level of that signal, and a second component in at least one of said connecting means connected to a negative polarity voltage source having a negative voltage in the predetermined voltage range to reduce the voltage level on that return line to a non-data signal level when data delivery has been completed.

2. The circuit arrangement of claim 1 further characterized in that the first element of the line isolation circuit means comprises a diode and the second element is a pull-down resistor.

3. The circuit arrangement of claim 1 further characterized in that said communications circuit forms part of a serial port of the master processing unit.

4. The circuit arrangement of claim 2 further characterized in that said data signal segments contain data bits at a selected positive voltage level and data bits at a selected negative voltage level approximately equal in magnitude to that of the positive voltage level but of opposite polarity.

5. The circuit arrangement of claim 4 further characterized in that the non-data signal level is a negative voltage level approximately equal in magnitude to that of the positive voltage level of the positive voltage data bits but of opposite polarity, and which non-data signal level has a negative voltage level approximately equal to that of the data bits of negative voltage level.

6. The circuit arrangement of claim 1 further characterized in that a receiver circuit is located at the input of each terminal and receives data from the master processing unit for the terminal and a driver is located on the output of each terminal.

7. The circuit arrangement of claim 6 further characterized in that the driver is located between the output of each terminal and the line isolation circuit of that terminal.

8. The circuit arrangement of claim 1 further characterized in that said terminals are connected to said master processing unit in an RS-232 format.

9. An improvement in a circuit arrangement for multiplexing digital data from a plurality of terminals and a master processing unit over a non-looped data delivery line and a non-looped data return line where the terminals are all connected serially with respect to a single communications circuit of said master processing unit and where the data delivery line and data return line each have only one end connected to said communications circuit but do not have the opposite ends of said lines looped back to said communications circuit, and further where positive polarity voltage bits of predefined voltage level and negative polarity voltage bits of the same predefined voltage magnitude as the positive polarity bits but of opposite polarity represent data to be transmitted, and additional negative polarity voltage bits having substantially the same predefined voltage magnitude as the positive polarity bits but of opposite polarity represent a non-data signal level, the improvement comprising: a diode on the output of each terminal connecting the terminal to the return line so that a data signal of a selected positive voltage level from that terminal can be introduced on the return line for delivery to the meter processing unit, said diode being oriented to prevent biasing of positive polarity voltage data onto the data return line and preventing such data bits from entering that terminal from the return line to thereby prevent any other terminal reducing that selected positive voltage level, and a pull-down resistor on the output of at least one of the terminals connected to a negative polarity voltage source at the predefined negative polarity voltage to reduce the voltage level on the return line to a non-data signal level when data delivery has been completed.

10. The improvement in the circuit arrangement of claim 9 further characterized in that a pull-down resistor is connected to the output of each terminal.

11. The improvement in the circuit arrangement of claim 9 further characterized in that said communications circuit forms part of a serial port of the master processing unit.

12. A system for multiplexing digital information between a central master processing unit and a plurality of terminals serially connected to a communications circuit of that central master processing unit, said system comprising:
   (a) A first non-looped data bus from said communications circuit for delivery of information from said terminals to said processing unit or from said processing unit to said terminals, said first data bus having only one end connected to the communications circuit of said master processing unit but not having the opposite end of said first data bus looped back to said communications circuit of said master processing unit,
   (b) a second non-looped data bus from said communications circuit for delivery of information from said terminals to said processing unit or from said processing unit to said terminals, but in a direction opposite that of information on said first data line, said second data bus having only one end connected to the communications circuit of said master processing unit but not having the opposite end of said second data bus looped back to said communications circuit of said master processing unit,
   (c) the information for delivery between the terminals and the processing unit being characterized by positive polarity voltage bits of predefined voltage levels and negative polarity bits of the same predefined voltage magnitude as the positive polarity bits but of opposite polarity to represent segments of data to be transmitted and which segments are also defined by data start bits and data stop bits, and additional negative polarity voltage bits having substantially the same predefined voltage magnitude as the positive polarity bits but of opposite polarity to represent non-data signal levels,
   (d) a first conductor at each terminal connecting that terminal to said first data bus,
   (e) a second conductor at each terminal connecting that terminal to said second data bus so that each of the terminals are in a series arrangement with respect to the communications circuit and in a parallel arrangement across the first and second data busses,
   (f) a diode in the second conductor of each terminal between the terminal and the second conductor, said diode being oriented to prevent biasing of positive voltage data bits onto the first data bus and preventing such data bits from entering that terminal from the first data bus to thereby prevent any other terminal from reducing the selected positive voltage level, and
   (g) a pull-down resistor connected to the output of the diode on at least one of the terminals, and being connected to a negative polarity voltage source at the predefined negative polarity voltage to reduce the voltage on the first data bus to a non-data signal level when delivery of information has been completed.

13. The system of claim 12 further characterized in that said diode is on the output of the terminal and is biased away from the terminal.

14. The system of claim 12 further characterized in that said first data bus delivers information from said terminals to said processing unit and said second data bus delivers information from said processing unit to said terminals.

15. The system of claim 12 further characterized in that a receiver circuit is located at the input of each terminal and receives data from the master processing unit for the terminal and a driver is located on the output of each terminal.

16. The system of claim 12 further characterized in that said terminals are connected to said master processing unit in an RS-232 format.

* * * * *